No. 872,303. PATENTED NOV. 26, 1907.
W. L. PATTERSON.
PROJECTION APPARATUS.
APPLICATION FILED MAY 15, 1907.
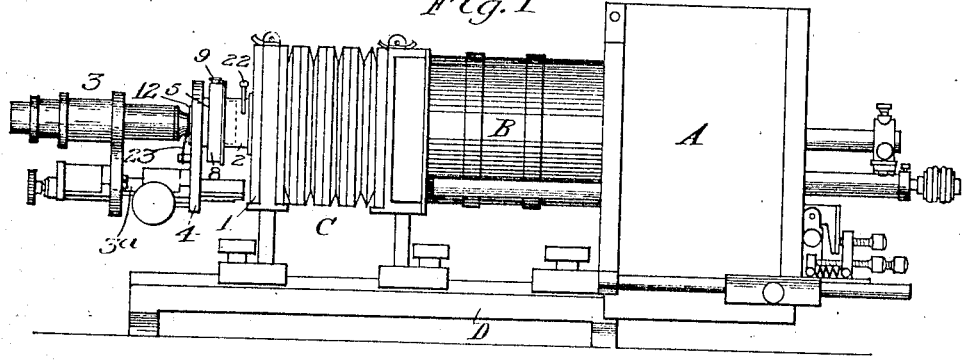
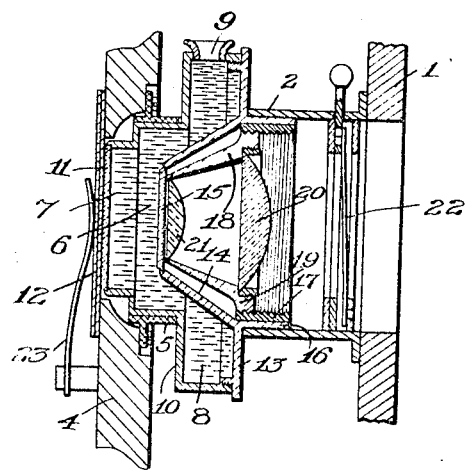

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

PROJECTION APPARATUS.

No. 872,303.    Specification of Letters Patent.    Patented Nov. 26, 1907.

Application filed May 15, 1907. Serial No. 373,774.

To all whom it may concern:

Be it known that I, WILLIAM L. PATTERSON, of Rochester, in the county of Monroe and State of New York, have invented certain new and useful Improvements in Projection Apparatus; and I do hereby declare the following to be a full, clear, and exact description of the same, reference being had to the accompanying drawings, forming a part of this specification, and to the reference-numerals marked thereon.

This invention relates to projection apparatus of the type in which rays from a suitable source of light are concentrated or condensed upon a suitable object, the image of which is projected upon a screen or into a camera by a microscope. In these apparatus, the object from which the image is formed consists in some instances of a specimen embedded in cement upon a transparent plate, and as the heat produced by condensing the rays is very great the cement is softened and the specimen cooked, thereby causing the destruction of the plate.

It is an object of my invention to make provision for the arrangement of a cooling device in such relation to the object and to the microscope condenser that the destruction of these plates, which in many instances are very valuable, is prevented.

To these and other ends the invention consists in certain improvements and combinations of parts all as will be hereinafter more fully described, the novel features being pointed out in the claims at the end of the specification.

In the drawings: Figure 1 is a side elevation of a projection apparatus embodying my invention. Fig. 2 is an axial section of the cooling cell showing its relation to the stage and the condensing system.

With extended reference to the drawings A indicates a suitable illuminator casing containing a lamp of any desired type and directing the rays from the latter to a main condensing system B which in turn is connected to the bellows C, all suitably supported on an optical bench D. The front board 1 of the bellows C has in the present instance, a tube 2 projecting therefrom and serving as as upport or attaching means for the projection device herein shown. The projection device, in this embodiment comprises a microscope 3 moved by a suitable adjusting mechanism 3ª to and from its stage 4 which carries on its front side a plate or object clamp 23 and in this instance forms with latter means or devices for holding an object 12 between the microscope and the microscope condenser to be hereinafter described. Extending from the other or rear side of the stage is a substage 5 into which preferably fits a cooling device in the form of a liquid containing chamber or cell which in present instance comprises a central portion 6, a reduced portion 7 and an enlarged portion 8 formed with a filling opening 9, the last two portions being arranged on opposite sides of the central portion so that when the latter is slidingly fitted into engagement with the inner wall of the substage, the reduced portion will project into the inner stage and the enlarged portion will lie outside of the substage with the walls 10 thereof forming a shoulder and abutting the free end of the sub-stage to limit the inward movement of the cell. . The forward or reduced end of the cell is closed by a transparent plate 11, the front face of which lies substantially in the plane of the outer or front face of the stage so that a specimen holding plate or object 12 may lie in contact or substantially in contact with the cell and thus be maintained in a cooled state.

The wall of the rear or enlarged end of the cell is formed by a cap 13 which has screw threaded engagement with the other portion of the shell, and is provided with an inwardly extending pocket or a depression 14, the bottom of which is formed by a transparent plate 15. Projecting from the rear wall 13 and about the pocket or depression 14 is an annular flange 16 which, preferably fits within the tube 2 and receives the ring 17 of the condensing device.

As shown, the substage microscope condenser comprises a hollow frusto-conical shell 18 having a flange 19 at its larger end formed with screw threads to engage the inner wall of the ring 17, a pair of plano convex lenses 20 and 21 being respectively arranged at the larger and at the smaller end of the shell, and having a sufficient length of focus to concentrate the light through the cooling cell and upon the object. When the condensing device and the cooling cell are connected, the tapered end of the former projects into the pocket or depression in the latter so that the lenses of the condenser are entirely surrounded by the cooling cell and the outer or forward lens 21 is substantially in contact with the plate 15.

To regulate the amount of light an iris diaphragm 22 of any type may be mounted in any suitable position, as for instance, on the tube 2 which projects from the front board of the bellows.

It is apparent that rays passing through the condenser will also be compelled to pass through the cooling cell before reaching the specimen plate, thereby becoming cooled so that they will not act in a destructible manner upon the object on the plate or upon the cement securing the same.

While the cooling cell has been illustrated in the form of a separate device it is to be understood that I do not wish to be limited to this construction as I consider myself to be the first to arrange a cooling device of any form in a position so that it will contact with the object on the stage.

I claim as my invention.

1. The combination with a microscope and a condenser arranged to direct light rays to the microscope, of a cooling cell arranged between the microscope and the condenser, and means for holding the object in contact with the cooling cell.

2. The combination with a microscope stage, of a cooling cell having its front wall lying in the plane of the front wall of the stage.

3. The combination with a microscope stage of a cooling cell projecting into the stage.

4. The combination with a microscope and a microscope stage, of a cooling cell arranged to contact with an object on the stage, and a condenser arranged to direct light rays through the cell to the microscope.

5. The combination with a microscope and a stage, of a cooling chamber having transparent walls, the forward one being substantially in the plane of the front wall of the stage, and a condenser for directing rays through the cooling chamber to the microscope.

6. The combination with a microscope, a stage, and a condenser for the rays passing to the microscope, of a cooling cell receiving rays from and surrounding the condenser and projecting into the stage.

7. The combination with a microscope, a stage, and a substage condenser for the rays passing to the microscope, of a cooling cell receiving rays from and surrounding the said condenser.

8. A cooling cell for the rays from a microscope condenser, formed with a pocket in one wall, said pocket having a transparent bottom.

9. A cooling cell for the rays from a microscope condenser comprising a central cylindrical portion; a reduced portion on one side thereof, having a transparent wall; and an enlarged portion on the other side, provided with a pocket having a transparent bottom.

10. The combination of a cooling cell having a pocket, and a microscope condenser arranged in the pocket.

11. The combination with a stage having a sub-stage, of a cooling cell fitted in the substage, projecting into the stage and having a transparent wall substantially in the plane of the front wall of the stage and a pocket in its opposite wall provided with a transparent bottom, and a condenser secured to the cooling cell and projecting into the pocket.

WILLIAM L. PATTERSON.

Witnesses:
GEORGE H. LEFFLER,
LOUIS M. POTTER.